United States Patent
Motofusa et al.

(10) Patent No.: US 12,206,282 B2
(45) Date of Patent: Jan. 21, 2025

(54) BACKUP POWER SUPPLY SYSTEM AND MOVING VEHICLE

(71) Applicant: Panasonic Intellectual Property Management Co., Ltd., Osaka (JP)

(72) Inventors: Toshiharu Motofusa, Kyoto (JP); Yohsuke Mitani, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 88 days.

(21) Appl. No.: 18/015,249

(22) PCT Filed: May 18, 2021

(86) PCT No.: PCT/JP2021/018832
§ 371 (c)(1),
(2) Date: Jan. 9, 2023

(87) PCT Pub. No.: WO2022/024508
PCT Pub. Date: Feb. 3, 2022

(65) Prior Publication Data
US 2023/0318350 A1    Oct. 5, 2023

(30) Foreign Application Priority Data

Jul. 31, 2020    (JP) ................ 2020-131111

(51) Int. Cl.
*H02J 9/06*        (2006.01)
*B60L 58/19*       (2019.01)
*H02J 7/34*        (2006.01)

(52) U.S. Cl.
CPC ............. *H02J 9/061* (2013.01); *B60L 58/19* (2019.02); *H02J 7/34* (2013.01); *B60L 2210/10* (2013.01); *H02J 2310/48* (2020.01)

(58) Field of Classification Search
CPC .......... H02J 9/061; H02J 7/34; H02J 2310/48; H02J 1/00; H02J 7/00; H02J 9/06;
(Continued)

(56) References Cited

U.S. PATENT DOCUMENTS 3,999,078 A * 12/1976 Udvardi-Lakos ....... H02J 9/062
                                                            307/66
4,297,629 A * 10/1981 Godard ................. H02J 7/0024
                                                            307/66
(Continued)

FOREIGN PATENT DOCUMENTS

JP    H05-003634 A    1/1993
JP    2009-055702 A   3/2009
(Continued)

OTHER PUBLICATIONS

International Search Report dated Jul. 13, 2021 issued in International Patent Application No. PCT/JP2021/018832, with English translation.

*Primary Examiner* — Daniel Kessie
*Assistant Examiner* — Brian K Baxter
(74) *Attorney, Agent, or Firm* — Rimon P.C.

(57) ABSTRACT

A backup power supply system supplies power to one or more loads in a situation where a power supply has caused a failure. The backup power supply system includes a plurality of power storage devices and a switching unit. The plurality of power storage devices are charged by the power supply. The switching unit switches electrical connection between the plurality of power storage devices to either a first state where the plurality of power storage devices are connected to the power supply in parallel or a second state where the plurality of power storage devices are connected to each other in series. The switching unit switches the electrical connection to the first state while the plurality of power storage devices are being charged and switches the
(Continued)

electrical connection to the second state when the power supply has caused the failure.

17 Claims, 7 Drawing Sheets

(58) Field of Classification Search
CPC ........ B60L 58/19; B60L 2210/10; B60L 1/00; B60L 3/0046; B60L 3/0092; Y02T 10/70
See application file for complete search history.

(56) References Cited

U.S. PATENT DOCUMENTS

| | | | | |
|---|---|---|---|---|
| 4,564,797 A * | 1/1986 | Binkley | ........... | H02J 7/342 |
| | | | | 320/105 |
| 5,225,761 A * | 7/1993 | Albright | ........... | H02J 7/1423 |
| | | | | 320/128 |
| 9,577,454 B2 * | 2/2017 | Seymour | ........... | H02J 7/0013 |
| 11,052,771 B2 * | 7/2021 | Itou | ........... | H02J 7/00 |
| 2004/0257041 A1 * | 12/2004 | Nagaoka | ........... | H02J 7/0024 |
| | | | | 320/128 |
| 2005/0099750 A1 * | 5/2005 | Takahashi | ........... | H02J 9/061 |
| | | | | 361/92 |
| 2007/0052295 A1 * | 3/2007 | Frucht | ........... | H02J 9/06 |
| | | | | 307/66 |
| 2009/0128158 A1 * | 5/2009 | Kawai | ........... | H02M 3/07 |
| | | | | 324/433 |
| 2009/0167242 A1 * | 7/2009 | Naganuma | ........... | H02J 7/0025 |
| | | | | 320/118 |
| 2011/0115427 A1 * | 5/2011 | Morita | ........... | H02J 7/34 |
| | | | | 320/149 |
| 2011/0133558 A1 * | 6/2011 | Park | ........... | H02J 3/32 |
| | | | | 307/66 |
| 2011/0251809 A1 * | 10/2011 | Stollenwerk | ........... | B61L 1/187 |
| | | | | 324/656 |
| 2012/0032505 A1 * | 2/2012 | Kusumi | ........... | B60L 50/16 |
| | | | | 307/10.1 |
| 2012/0116601 A1 * | 5/2012 | Yano | ........... | G06F 1/30 |
| | | | | 713/320 |
| 2012/0209441 A1 * | 8/2012 | Hirata | ........... | H01M 16/006 |
| | | | | 700/292 |
| 2012/0299383 A1 * | 11/2012 | Cyuzawa | ........... | H02J 3/381 |
| | | | | 307/75 |
| 2012/0326654 A1 * | 12/2012 | Ito | ........... | B60L 53/11 |
| | | | | 320/103 |
| 2013/0015819 A1 * | 1/2013 | Nakashima | ........... | H02J 7/0019 |
| | | | | 320/126 |
| 2013/0082663 A1 * | 4/2013 | Mori | ........... | H02J 7/00 |
| | | | | 320/135 |
| 2013/0229152 A1 * | 9/2013 | Kurimoto | ........... | B60L 58/13 |
| | | | | 320/126 |
| 2013/0300370 A1 * | 11/2013 | Hotta | ........... | H02J 7/0031 |
| | | | | 320/117 |
| 2013/0320927 A1 * | 12/2013 | Kumagai | ........... | H02J 7/0013 |
| | | | | 320/126 |
| 2014/0084869 A1 * | 3/2014 | Ryu | ........... | H02J 7/0014 |
| | | | | 320/118 |
| 2014/0204624 A1 * | 7/2014 | Djenguerian | ........... | H02M 3/33523 |
| | | | | 363/21.12 |
| 2015/0015076 A1 * | 1/2015 | Park | ........... | H02J 9/065 |
| | | | | 307/66 |
| 2015/0270744 A1 * | 9/2015 | Lacarnoy | ........... | H02J 9/061 |
| | | | | 307/66 |
| 2016/0049809 A1 * | 2/2016 | Kajitani | ........... | H02J 7/345 |
| | | | | 320/118 |
| 2016/0099588 A1 * | 4/2016 | Bae | ........... | H02J 7/00047 |
| | | | | 320/117 |
| 2017/0063150 A1 * | 3/2017 | Sakamoto | ........... | H02J 7/0013 |
| 2017/0346334 A1 * | 11/2017 | Mergener | ........... | H02J 7/0025 |
| 2018/0067528 A1 * | 3/2018 | Wang | ........... | H01M 10/482 |
| 2018/0171874 A1 * | 6/2018 | Klonowski | ........... | F02N 11/0866 |
| 2019/0288528 A1 * | 9/2019 | Greetham | ........... | B60L 58/19 |
| 2020/0062199 A1 * | 2/2020 | Kwon | ........... | H02H 3/085 |
| 2021/0129700 A1 * | 5/2021 | Song | ........... | B60L 58/19 |
| 2021/0249895 A1 * | 8/2021 | Terada | ........... | H02J 7/0068 |
| 2021/0399557 A1 * | 12/2021 | Ono | ........... | H02J 7/007182 |
| 2022/0021233 A1 * | 1/2022 | Kambara | ........... | H02J 1/086 |
| 2022/0029452 A1 * | 1/2022 | Kambara | ........... | H02J 7/00714 |
| 2022/0224147 A1 * | 7/2022 | Uchida | ........... | H02J 7/0016 |
| 2023/0192017 A1 * | 6/2023 | Mitani | ........... | B60R 16/033 |
| | | | | 307/23 |
| 2023/0238824 A1 * | 7/2023 | Tamaki | ........... | H02J 9/061 |
| | | | | 307/66 |
| 2024/0079885 A1 * | 3/2024 | Siu | ........... | H01M 10/425 |

FOREIGN PATENT DOCUMENTS

| | | |
|---|---|---|
| JP | 2020-005481 A | 1/2020 |
| WO | 2011/121974 A1 | 10/2011 |
| WO | 2020/008732 A1 | 1/2020 |

* cited by examiner

BACKUP POWER SUPPLY SYSTEM AND MOVING VEHICLE

CROSS-REFERENCE OF RELATED APPLICATIONS

The application is the U.S. National Phase under 35 U.S.C. § 371 of International Patent Application No. PCT/JP2021/018832, filed on May 18, 2021, which in turn claims the benefit of Japanese Patent Application No. 2020-131111, filed on Jul. 31, 2020, the entire disclosures of which Applications are incorporated by reference herein.

TECHNICAL FIELD

The present disclosure generally relates to a backup power supply system and a moving vehicle. More particularly, the present disclosure relates to a backup power supply system for supplying power to one or more loads when a power supply has caused a failure and a moving vehicle including such a backup power supply system.

BACKGROUND ART

A boosting power supply circuit (voltage transformer circuit) of Patent Literature 1 supplies, when power stops being supplied from a battery, power from a lithium-ion battery (power storage device) as a backup power supply to various types of loads. The boosting power supply circuit boosts a DC voltage supplied from the lithium-ion battery and supplies the voltage thus boosted to the various types of loads.

CITATION LIST

Patent Literature

Patent Literature 1: JP 2020-5481 A

SUMMARY OF INVENTION

The boosting power supply circuit boosts the output voltage of the lithium-ion battery and supplies the voltage thus boosted at a time to the various types of loads. Thus, the boosting power supply circuit needs to boost the voltage adaptively to a load having a higher minimum guaranteed operating voltage than any other one of the various types of loads and supply the voltage thus boosted at a time. This makes the voltage and current to be processed inside the boosting power supply circuit so high and so large that the noise generated inside the boosting power supply circuit may increase significantly.

It is therefore an object of the present disclosure to provide a backup power supply system and a moving vehicle, both of which are configured to reduce the noise to be generated.

A backup power supply system according to an aspect of the present disclosure supplies power to one or more loads in a situation where a power supply has caused a failure. The backup power supply system includes a plurality of power storage devices and a switching unit. The plurality of power storage devices are charged by the power supply. The switching unit switches electrical connection between the plurality of power storage devices to either a first state where the plurality of power storage devices are connected to the power supply in parallel or a second state where the plurality of power storage devices are connected to each other in series. The switching unit switches the electrical connection to the first state while the plurality of power storage devices are being charged and switches the electrical connection to the second state when the power supply has caused the failure.

A moving vehicle according to another aspect of the present disclosure includes the backup power supply system described above and a moving vehicle body. The moving vehicle body is equipped with the backup power supply system and the one or more loads.

The present disclosure achieves the advantage of enabling reducing the noise to be generated.

DESCRIPTION OF EMBODIMENTS

Embodiment (1) Overview

A backup power supply system 1 according to an exemplary embodiment will be described with reference to the accompanying drawings. Note that the embodiment to be described below is only an exemplary one of various embodiments of the present disclosure and should not be construed as limiting. Rather, the exemplary embodiment may be readily modified in various manners depending on a design choice or any other factor without departing from a true spirit and scope of the present disclosure.

Figure 1:
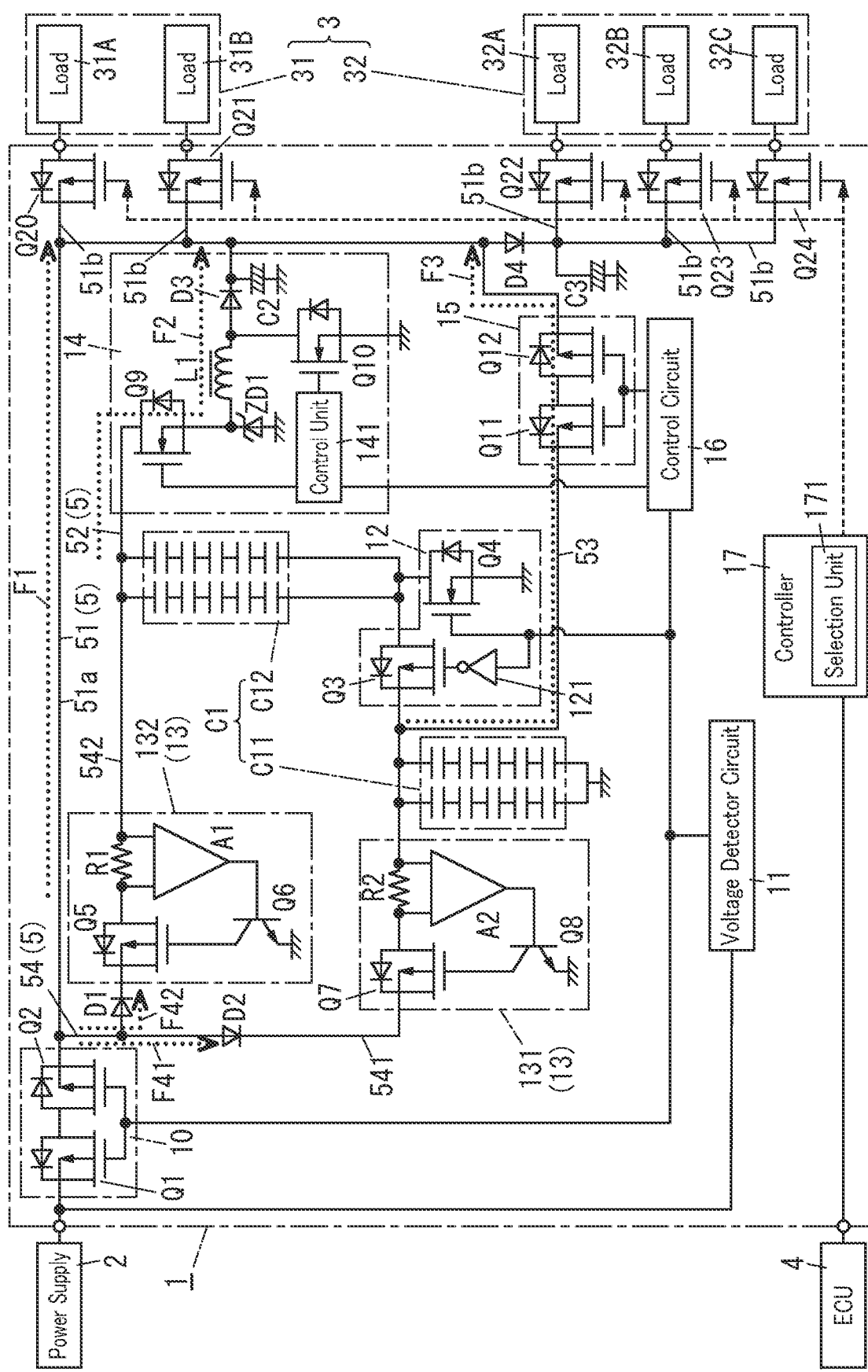
FIG. 1 is a schematic circuit diagram of a backup power supply system according to an exemplary embodiment.
Figure 2:
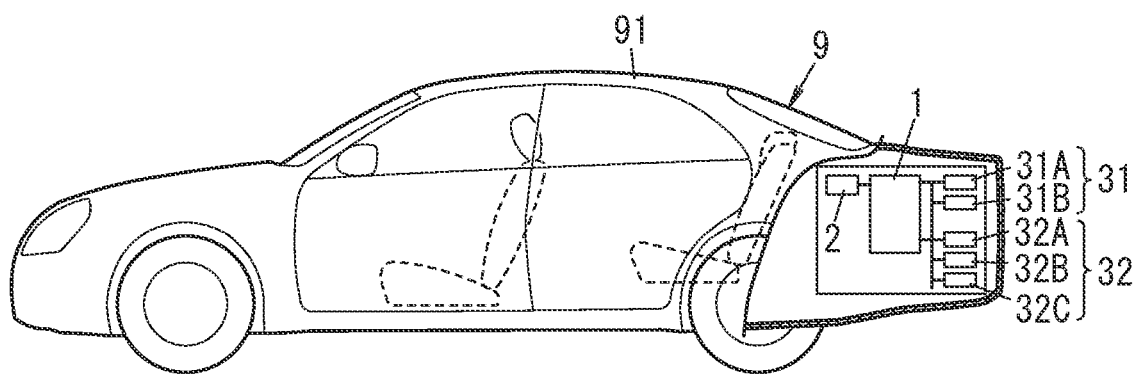
FIG. 2 is a partially cutaway side view of a vehicle equipped with the backup power supply system.

As shown in FIG. 1, the backup power supply system 1 may be installed in, for example, a vehicle 9 (refer to FIG. 2). If the power supply 2 (such as a battery) has caused a failure, the backup power supply system 1 supplies power from a plurality of power storage devices C1 to one or more loads 3 (e.g., a plurality of loads in this embodiment). This allows the one or more loads 3 to operate continuously with the power supplied from the plurality of power storage devices C1 even if the power supply 2 has caused a failure. As used herein, the expression "the power supply 2 causes a failure" refers to a situation where the supply of power from the power supply 2 to the loads 3 is discontinued due to a failure, deterioration, or disconnection of the power supply 2.

The backup power supply system 1 according to this embodiment includes the plurality of power storage devices C1 and a switching unit 12. The plurality of power storage devices C1 are charged by the power supply 2. The switching unit 12 switches electrical connection between the plurality of power storage devices C1 to either a first state where the plurality of power storage devices C1 are connected to the power supply 2 in parallel or a second state where the plurality of power storage devices C1 are connected to each other in series. The switching unit 12 switches the electrical connection to the first state while the plurality of power storage devices C1 are being charged and switches the electrical connection to the second state when the power supply 2 has caused a failure.

When charged, the plurality of power storage devices C1 are connected to the power supply 2 in parallel. This allows the plurality of power storage devices C1 to be charged with a lower voltage than in a situation where the plurality of power storage devices C1 are connected to each other in series. Thus, there is no need for a charger circuit for charging the plurality of power storage devices C1 to boost the voltage of the power supply 2 to a higher voltage, thus reducing the chances of the switching operation by the charger circuit generating noise and/or heat. In addition, in a situation where the power supply 2 has caused a failure, the plurality of power storage devices C1 are connected to each other in series. This allows the plurality of power storage devices C1 to output a higher voltage than in a situation where the plurality of power storage devices C1 are connected to each other in parallel. Thus, there is no need for a voltage transformer circuit for transforming the output voltage of the plurality of power storage devices C1 into a voltage required for the load 3 to boost the output voltage of the plurality of power storage devices C1 to a higher voltage, thus reducing the chances of the switching operation by the voltage transformer circuit generating noise and/or heat. Consequently, the present disclosure enables providing a backup power supply system 1 with ability to reduce the noise to be generated and providing a backup power supply system 1 with ability to reduce the heat to be generated.

In addition, the backup power supply system 1 according to this embodiment is installed in a vehicle 9 including the power supply 2 and the plurality of loads 3. That is to say, the vehicle 9 (moving vehicle) includes the backup power supply system 1 and a moving vehicle body 91. The moving vehicle body 91 is equipped with the backup power supply system 1 and the one or more loads 3. In the following description of embodiments, a situation where the backup power supply system 1 is installed in a vehicle 9 will be described as an example. However, this is only an example and should not be construed as limiting. Alternatively, the backup power supply system 1 may also be installed in any other suitable type of moving vehicle (such as an aircraft, a watercraft, or a railway train).

In this embodiment, there are a plurality of loads 3 to be supplied with power by the backup power supply system 1 in a situation where the power supply 2 has caused a failure. The plurality of loads 3 includes a first load 31 including an actuator and a second load 32 serving as a control system for controlling the actuator.

The first load 31 is a power system load 3 including an actuator. The first load 31 is a load 3 that satisfies a condition that the load 3 has greater power consumption (i.e., requires a larger operating current) than the second load 32 (hereinafter referred to as a "first condition") and a condition that the load 3 has a lower minimum guaranteed operating voltage than the second load 32 (hereinafter referred to as a "second condition"). As used herein, the "operating current" refers to an electric current to be supplied to allow the load 3 to operate. Also, the "minimum guaranteed operating voltage" as used herein refers to a minimum required voltage to be applied for the load 3 to operate. That is to say, the first load 31 is a load which requires a larger operating current, but of which the operating voltage may decrease to a certain degree (i.e., which allows its operating voltage to decrease to a certain degree). Specifically, examples of the first load 31 include a braking device 31A that produces braking force (as labeled "brake" in FIG. 1) and an electronic power steering system (EPS) 31B for electronically assisting the driver in steering.

The second load 32 is a control system load for controlling the actuator. The second load 32 is a plurality of loads 3 that satisfy a condition that the loads 3 have smaller power consumption (i.e., requires a smaller operating current) than the first load 31 and a condition that the loads 3 have a higher minimum guaranteed operating voltage than the first load 31. That is to say, the second load 32 is a load which requires a smaller operating current, but which requires a relatively high operating voltage (i.e., which does not allow the operating voltage to decrease). Specifically, examples of the second load 32 include an electronic control unit (ECU) 32A for braking (i.e., for controlling the braking device 31A), an ECU 32B for controlling the electronic power steering system 31B, and an ECU 32C for controlling an advanced driver assistance system (ADAS). Note that these are only examples of the first load 31 and the second load 32 and should not be construed as limiting.

(1.1) Detailed Description of Backup Power Supply System

As described above, the backup power supply system 1 includes the plurality of power storage devices C1 and the switching unit 12. Also, as shown in FIG. 1, the backup power supply system 1 supplies the output power of the power supply 2 to the plurality of loads 3 while the power supply 2 is causing no failure and supplies the output power of the plurality of power storage devices C1 to the plurality of loads 3, instead of the output power of the power supply 2, if the power supply 2 has caused a failure. That is to say, the backup power supply system 1 has a power supply path 5, through which the output power of the power supply 2 is supplied to the plurality of loads 3 while the power supply 2 is causing no failure, and through which the output power of the plurality of power storage devices C1 is supplied to the plurality of loads 3 if the power supply 2 has caused a failure. The backup power supply system 1 further includes a main switch 10, a voltage detector circuit 11, dropper power supply circuits 13 for charging, a voltage transformer circuit 14, a switch 15, a control circuit 16, and a controller 17.

Next, these constituent elements of the backup power supply system 1 will be described in detail one by one.

(1.1.1) Power Supply Path

The power supply path 5 is an electrical path through which the output power of the power supply 2 is supplied to the plurality of loads 3 and the plurality of power storage devices C1 and through which the output power of the plurality of power storage devices C1 is supplied to the plurality of loads 3. The power supply path 5 includes a first power supply path 51, a second power supply path 52, a third power supply path 53, and a fourth power supply path 54.

The first power supply path 51 is a power supply path through which the output power of the power supply 2 is supplied to the plurality of loads 3 (as indicated by the arrow F1 in FIG. 1). That is to say, the backup power supply system 1 includes a power supply path 5 (first power supply path 51) for supplying power from the power supply 2 to the one or more loads 3 (e.g., a plurality of loads 3 in this embodiment). The first power supply path 51 includes a main electrical path 51a and a plurality of branch paths 51b branched from the main electrical path 51a. The main electrical path 51a is connected to an output unit of the power supply 2. The plurality of branch paths 51b are associated one to one with the plurality of loads 3. The plurality of branch paths 51b are branched from the main electrical path 51a at multiple different points and connected to their associated loads 3.

The second power supply path 52 (as indicated by the arrow F2 in FIG. 1) and the third power supply path 53 (as indicated by the arrow F3 in FIG. 1) are backup power supply paths, through which the output power of the plurality of power storage devices C1 is supplied to the plurality of loads 3. In this case, the plurality of (e.g., two in this embodiment) power storage devices C1 includes a first power storage device C11 to have the lower potential in the second state (where the two power storage devices C1 are connected to each other in series) and a second power storage device C12 to have the higher potential in the second state. The second power supply path 52 is a main power supply path for supplying power from both of the two power storage devices C1, which are connected to each other in series, to the loads 3 in a situation where the power supply 2 has caused a failure. The second power supply path 52 is an electrical path through which the output voltage of the two power storage devices C1 is supplied to the loads 3 via the voltage transformer circuit 14. The third power supply path 53 is a bypass path, through which power is supplied from the second power storage device C12 having the lower potential to the one or more loads 3. The third power supply path 53 (bypass path) is an electrical path for supplying the output voltage of the second power storage device C12 to the loads 3 not via the voltage transformer circuit 14.

The fourth power supply path 54 is an electrical path through which the output power of the power supply 2 is supplied to the power storage devices C1. The fourth power supply path 54 includes a first charge path 541 (as indicated by the arrow F41 in FIG. 1) for supplying the output power of the power supply 2 to the first power storage device C11 and a second charge path 542 (as indicated by the arrow F42 in FIG. 1) for supplying the output power of the power supply 2 to the second power storage device C12. The dropper power supply circuits 13 are inserted into the fourth power supply path 54. That is to say, the backup power supply system 1 further includes the dropper power supply circuits 13 for charging the plurality of power storage devices C1 with the power supplied from the power supply 2. The dropper power supply circuits 13 include a first dropper power supply circuit 131 inserted into the first charge path 541 and a second dropper power supply circuit 132 inserted into the second charge path 542.

(1.1.2) Main Switch

The main switch 10 is inserted into the main electrical path 51a of the first power supply path 51. The main switch 10 is connected between the power supply 2 and a branch node between the first power supply path 51 and the fourth power supply path 54. Also, the main switch 10 is connected between the power supply 2 and a node where the second power supply path 52 and the third power supply path 53 are confluent with the first power supply path 51.

The main switch 10 includes, for example, two switching elements Q1, Q2 which are inserted into the main electrical path 51a in series. The switching elements Q1, Q2 may be semiconductor switches (such as p-channel metal-oxide semiconductor field effect transistors (MOSFETs)), for example. These switching elements Q1, Q2 have their drains electrically connected to each other and have their gates also electrically connected to each other and are switchable from a state where a current flows bidirectionally to a state where the current is cut off, or vice versa.

These switching elements Q1, Q2 are turned ON and OFF in response to a power failure signal supplied from the voltage detector circuit 11. Turning the switching elements Q1, Q2 ON allows power to be supplied from the power supply 2 to the loads 3 through the first power supply path 51 and also allows power to be supplied from the power supply 2 to the power storage devices C1 through the fourth power supply path 54. Turning the switching elements Q1, Q2 OFF causes the first power supply path 51 and the fourth power supply path 54 to be cut off.

(1.1.3) Voltage Detector Circuit

The voltage detector circuit 11 monitors the output voltage (e.g., 12.5 V in a normal state) of the power supply 2. When finding the output voltage of the power supply 2 equal to or greater than a predetermined threshold value (of 9 V, for example), the voltage detector circuit 11 decides that the power supply 2 be causing no failure. On the other hand, when finding the output voltage of the power supply 2 less than the threshold value, the voltage detector circuit 11 decides that the power supply 2 have caused a failure and outputs the power failure signal indicating that a failure of the power supply 2 has been detected.

Note that the threshold value described above is only an example and may be changed as appropriate according to the output voltage of the power supply 2 or the minimum guaranteed operating voltage of the loads 3, for example.

(1.1.4) Power Storage Devices

The power storage devices C1 (namely, the first power storage device C11 and the second power storage device C12) are provided as backup power supplies (i.e., either auxiliary or reserve power supplies) for the power supply 2. In other words, the power storage devices C1 are power supplies that may supply power to the plurality of loads 3 in a situation where the power supply 2 has caused a failure. The power storage devices C1 may be, for example, electrical double layer capacitors (EDLCs) which may be charged and discharged rapidly. Each power storage device C1 may be made up of two or more power storage devices (such as EDLCs) which are electrically connected to each other in parallel, in series, or in parallel and series. That is to say, each power storage device C1 may be implemented as a parallel or series circuit of two or more power storage devices or a combination thereof.

(1.1.5) Dropper Power Supply Circuit

The dropper power supply circuits 13 include the first dropper power supply circuit 131 and the second dropper power supply circuit 132. The first power storage device C11 is connected between the output terminal of the first dropper power supply circuit 131 and a reference potential for the backup power supply system 1. The second power storage device C12 and a switching element Q4 of the switching unit 12 are connected to each other in series between the output terminal of the second dropper power supply circuit 132 and the reference potential. The first dropper power supply circuit 131 is provided for the first charge path 541. The second dropper power supply circuit 132 is provided for the second charge path 542. The first dropper power supply circuit 131 and the second dropper power supply circuit 132 have the same circuit configuration. Thus, the following description will be focused on the first dropper power supply circuit 131 with description of the second dropper power supply circuit 132 omitted.

The first dropper power supply circuit 131 is a constant-voltage circuit for charging the first power storage device C11 by lowering the output voltage (which is a first voltage of 12.5 V, for example) of the power supply 2 to a constant voltage (which is a second voltage of 12 V, for example), maintaining the constant voltage, and outputting the constant voltage to the first power storage device C11. The first dropper power supply circuit 131 may be, for example, a regulator circuit including a series circuit of a switching element Q7 and a resistor R2, which are inserted into the first charge path 541, an amplifier A2, and a switching element Q8. The switching elements Q7, Q8 may be semiconductor switches, for example. In this embodiment, the switching element Q7 may be a p-channel MOSFET, for example. The switching element Q8 may be an NPN transistor, for example, and connected between the control terminal of the switching element Q7 and the reference potential. The resistor R2 is a resistor for detecting the charge current flowing through the first power storage device C11. The voltage across the resistor R2 is supplied to the amplifier A2. The output terminal of the amplifier A2 is connected to the control terminal of the switching element Q8. The first dropper power supply circuit 131 is configured to regulate the current for charging the first power storage device C11 as the voltage across the resistor R2 increases. This makes the voltage when the first power storage device C11 is fully charged lower than the output voltage of the power supply 2. Note that the circuit configuration of the first dropper power supply circuit 131 shown in FIG. 1 is only an example and may be modified as appropriate.

(1.1.6) Switching Unit

The switching unit 12 switches the electrical connection between the first power storage device C11 and the second power storage device C12 to either the first state where the first power storage device C11 and the second power storage device C12 are connected to the power supply 2 in parallel or the second state where the first power storage device C11 and the second power storage device C12 are connected to each other in series.

The switching unit 12 includes switching elements Q3, Q4 and an inverter 121.

The switching element Q3 may be a semiconductor switching element (such as a MOSFET), for example. The switching element Q3 is connected between the high-potential terminal of the first power storage device C11 and the low-potential terminal of the second power storage device C12. An output signal of the inverter 121, i.e., an inverted one of the output signal of the voltage detector circuit 11, is supplied to the control terminal of the switching element Q3.

The switching element Q4 may be a semiconductor switching element (such as a MOSFET), for example. The switching element Q4 is connected between the low-potential terminal of the second power storage device C12 and the reference potential. The output signal of the voltage detector circuit 11 is supplied to the control terminal of the switching element Q3.

Thus, while the voltage detector circuit 11 is not outputting the power failure signal, the switching element Q3 turns OFF and the switching element Q4 turns ON, thus switching the electrical connection between the first power storage device C11 and the second power storage device C12 to the first state where the first power storage device C11 and the second power storage device C12 are connected to the power supply 2 in parallel. In the first state, the first power storage device C11 and the second power storage device C12 that are electrically connected to the power supply 2 in parallel are charged with the power supplied from the power supply 2. The first power storage device C11 and the second power storage device C12 are electrically connected to the power supply 2 in parallel, and therefore, are both charged to approximately 12 V.

On the other hand, while the voltage detector circuit 11 is outputting the power failure signal, the switching element Q3 turns ON and the switching element Q4 turns OFF, thus switching the electrical connection between the first power storage device C11 and the second power storage device C12 to the second state where the first power storage device C11 and the second power storage device C12 are connected to each other in series. In the second state, a sum of the respective voltages of the first power storage device C11 and the second power storage device C12 (i.e., a voltage of approximately 24 V) is output from the first power storage device C11 and the second power storage device C12 which are connected to each other in series.

Note that this circuit configuration of the switching unit 12 is only an example and should not be construed as limiting. Rather, the circuit configuration of the switching unit 12 may be modified as appropriate as long as the electrical connection between the first power storage device C11 and the second power storage device C12 may be switched to either the first state or the second state.

(1.1.7) Voltage Transformer Circuit

The voltage transformer circuit 14 is a constant-voltage circuit for transforming the output voltage of the first power storage device C11 and the second power storage device C12 that are connected to each other in series into a constant voltage, maintaining the constant voltage, and outputting the constant voltage thus maintained. The voltage transformer circuit 14 is provided for the second power supply path 52. That is to say, the voltage transformer circuit 14 transforms the output voltage of the plurality of power storage devices C1 that are connected to each other in series into an output voltage adapted to the one or more loads 3 in a situation where the power supply 2 has caused a failure (i.e., at the time of discharging).

The voltage transformer circuit 14 may be, for example, a step-up DC/DC converter. The voltage transformer circuit 14 includes switching elements Q9, Q10, a Zener diode ZD1, an inductor L1, a diode D3, a capacitor C2, and a control unit 141. The switching elements Q9, Q10 may be semiconductor switching elements (such as MOSFETs), for example. The switching element Q9 and the Zener diode ZD1 are connected to each other in series between the high-potential terminal of the second power storage device C12 and the reference potential. The inductor L1 and the switching element Q10 are connected to each other in series between the two terminals of the Zener diode ZD1. The diode D3 and the capacitor C2 are connected to each other in series between the two terminals of the switching element Q10.

The control unit 141 controls the ON/OFF states of the switching elements Q9, Q10.

While receiving no output instruction from the control circuit 16, the control unit 141 controls the switching element Q9 to OFF state to make the switching element Q10 stop performing the switching operation. In this manner, the control unit 141 stops the supply of power from the voltage transformer circuit 14 to the loads 3.

On the other hand, while receiving an output instruction from the control circuit 16, the control unit 141 controls the switching element Q9 to ON state and performs a PWM control on the switching element Q10. When the switching element Q9 turns ON, a voltage is applied from the first power storage device C11 and the second power storage device C12 which are connected to each other in series to the Zener diode ZD1 via the switching element Q9. Then, the control unit 141 performs a PWM control on the switching element Q10, thereby transforming the voltage across the Zener diode ZD1 into a predetermined voltage value and outputting the voltage value. The voltage transformer circuit 14 keeps the voltage slightly higher than the minimum guaranteed operating voltage (of 11.5 V, for example) of the loads 3 and outputs the voltage. This allows, even if the output voltage of the first power storage device C11 and the second power storage device C12 that are connected to each other in series decreases, the voltage output from the first power storage device C11 and the second power storage device C12 to the loads 3 to be maintained at a voltage higher than the minimum guaranteed operating voltage.

(1.1.8) Switch

The switch 15 is inserted into the third power supply path 53 (bypass path).

The switch 15 may include, for example, two switching elements Q11, Q12, which are inserted in series into the third power supply path 53. The switching elements Q11, Q12 may be semiconductor switches (such as p-channel MOSFETs), for example. These switching elements Q11, Q12 have their drains electrically connected to each other and have their gates also electrically connected to each other and are switchable from a state where a current flows bidirectionally to a state where the current is cut off, or vice versa.

These switching elements Q11, Q12 are turned ON and OFF in response to a control signal supplied from the control circuit 16. Turning the switching elements Q1, Q2 ON allows power to be supplied from the first power storage device C11 to the loads 3 through the third power supply path 53. Turning the switching elements Q11, Q12 OFF causes the third power supply path 53 to be cut off. If the power supply 2 has caused a failure, the switch 15 will remain ON until the voltage transformer circuit 14 is activated and will turn OFF when the voltage transformer circuit 14 is fully activated.

(1.1.9) Control Circuit

The control circuit 16 is implemented as, for example, a microcomputer including a processor and a memory. That is to say, the control circuit 16 is implemented as a computer system including a processor and a memory. The computer system performs the function of the control circuit 16 by making the processor execute an appropriate program. The program may be stored in advance in the memory. Alternatively, the program may also be downloaded via a telecommunications line such as the Internet or distributed after having been stored in a non-transitory storage medium such as a memory card.

In response to the power failure signal supplied from the voltage detector circuit 11, control circuit 16 controls not only the operation of the voltage transformer circuit 14 but also the ON/OFF states of the switch 15. In this embodiment, when the power supply 2 has caused a failure, the control circuit 16 starts to activate the voltage transformer circuit 14 and controls the switch 15 to keep the switch 15 ON until the voltage transformer circuit 14 is activated and to turn the switch 15 OFF when the voltage transformer circuit 14 is fully activated.

While the voltage detector circuit 11 is outputting no power failure signal, the control circuit 16 controls the switch 15 to OFF state to make the voltage transformer circuit 14 stop performing the voltage transformation operation. Thus, while the voltage detector circuit 11 is outputting no power failure signal, the second power supply path 52 and the third power supply path 53 are cut off.

When the voltage detector circuit 11 outputs the power failure signal, the control circuit 16 gives an output instruction to the voltage transformer circuit 14, thereby activating the voltage transformer circuit 14. On receiving the output instruction, the control unit 141 of the voltage transformer circuit 14 turns the switching element Q9 ON and starts performing a PWM control on the switching element Q10.

In addition, until a predetermined time (of 100 milliseconds (ms), for example) passes since the timing when the control circuit 16 received the power failure signal from the voltage detector circuit 11, the control circuit 16 keeps the switch 15 ON to allow power to be supplied from the first power storage device C11 having the lower potential to the loads 3 through the third power supply path 53. In this case, the predetermined time is set to be slightly longer than the time it takes for the voltage transformer circuit 14 to be ready to output a voltage equal to or higher than the minimum guaranteed operating voltage (i.e., for the voltage transformer circuit 14 to be fully activated) since the voltage transformer circuit 14 started to be activated. This allows, when the output voltage of the voltage transformer circuit 14 is lower than the minimum guaranteed operating voltage, the power to be supplied from the first power storage device C11 having the lower potential to the loads 3 through the third power supply path 53. Thereafter, when the predetermined time passes since the timing when the control circuit 16 received the power failure signal from the voltage detector circuit 11, the control circuit 16 turns the switch 15 OFF, cuts off the third power supply path 53, and has the power supplied from the voltage transformer circuit 14 to the loads 3.

(1.1.10) Controller

The controller 17 is implemented as, for example, a microcomputer including a processor and a memory. That is to say, the controller 17 is implemented as a computer system including a processor and a memory. The computer system performs the function of the controller 17 by making the processor execute an appropriate program. The program may be stored in advance in the memory. Alternatively, the program may also be downloaded via a telecommunications line such as the Internet or distributed after having been stored in a non-transitory storage medium such as a memory card.

The controller 17 performs the function of a selection unit 171 that selects, according to the status of use of a target device (e.g., a vehicle 9 in this embodiment) provided with the plurality of loads 3, any one of the plurality of loads 3 as a target load to which power is to be supplied (hereinafter simply referred to as a "target load 3"). The controller 17 receives, from an ECU 4 of the vehicle 9, notification information indicating the status of use of the vehicle 9. The selection unit 171 selects, in accordance with the notification information provided by the ECU 4, the target load 3. The backup power supply system 1 according to this embodiment further includes a plurality of switches Q20-Q24 for selectively supplying power to the plurality of loads 3. These switches Q20-Q24 are respectively inserted into a branch path 51b leading to the braking device 31A, a branch path 51b leading to the electronic power steering system 31B, a branch path 51b leading to the ECU 32A for braking, a branch path 51b leading to the ECU 32B for EPS, and a branch path 51b leading to the ECU 32C for ADAS. Each of these switches Q20-Q24 may be a semiconductor switch (such as a p-channel MOSFET), for example. Turning these switches Q20-Q24 ON or OFF under the control of the controller 17 makes the branch paths 51b provided with the switch Q20-Q24 electrically conductive or non-conductive.

This allows the supply of the power from the power storage devices C1 to the loads 3 connected to the branch paths 51b to be selectively provided or cut off.

While the power supply 2 is causing no failure, the controller 17 turns these switches Q20-Q24 ON to allow power to be supplied from the power supply 2 to all the loads 3.

In a situation where the power supply 2 has caused a failure, the selection unit 171 selects, in accordance with the notification information provided by the ECU 4, the target load 3. Then, the controller 17 turns ON only a switch associated with the target load 3 out of the switches Q20-Q24 to allow power to be supplied from the power storage devices C1 to only the target load 3.

In this embodiment, the selection unit 171 may select, for example, the target load 3 in the following manner according to the status of use of the vehicle 9. If the vehicle 9 is being driven autonomously when the power supply 2 has caused a failure, then the selection unit 171 selects all the loads 3 as target loads and the controller 17 controls all the switches Q20-Q24 to ON state. This allows power to be supplied from the power storage devices C1 to all the loads 3. As a result, if the vehicle 9 is being driven autonomously when the power supply 2 has caused a failure, then power is supplied from the power storage devices C1 to all the loads 3 participating in autonomous driving.

On the other hand, unless the vehicle 9 is being driven autonomously when the power supply 2 has caused a failure, the controller 17 controls the switch Q20 to ON state and controls the switches Q21-Q24 to OFF state. This allows cutting off the supply of power from the power storage devices C1 to the loads 3 connected to the switches Q21-Q24. As a result, power is supplied from the power storage devices C1 to the load (such as the braking device 31A) engaged in braking the vehicle 9 and requiring the driver's participation. On the other hand, no power is supplied from the power storage devices C1 to the other loads (such as the electronic power steering system and its ECU and the ECU of the braking device) not engaged in braking the vehicle 9 and not requiring the driver's participation.

(1.2) Description of Operation

Next, it will be described with reference to FIGS. 1-7 mainly how the backup power supply system 1 operates.

(1.2.1) When Power Supply is Operating Properly

While the power supply 2 is causing no failure, the voltage detector circuit 11 does not output the power failure signal. Thus, the main switch 10 turns ON and the control circuit 16 controls the switch 15 to OFF state to deactivate the voltage transformer circuit 14. Thus, the output power of the power supply 2 is suppled through the first power supply path 51 (specifically, the main electrical path 51a and the plurality of branch paths 51b) to the plurality of loads 3 (namely, the first load 31 and the second load 32).

Figure 3:
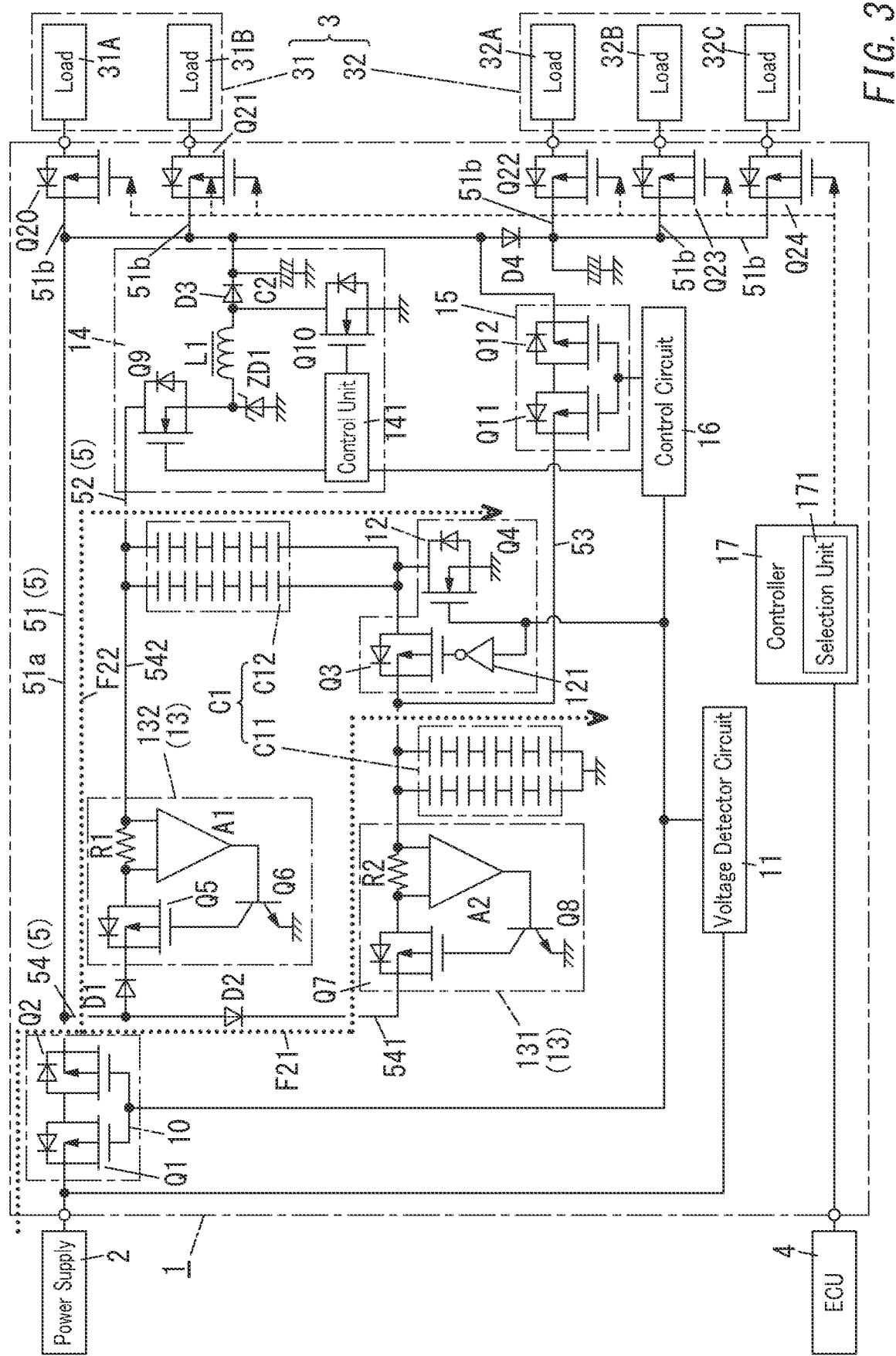
FIG. 3 is a schematic circuit diagram showing a current path during charging in the backup power supply system.
Figure 4:
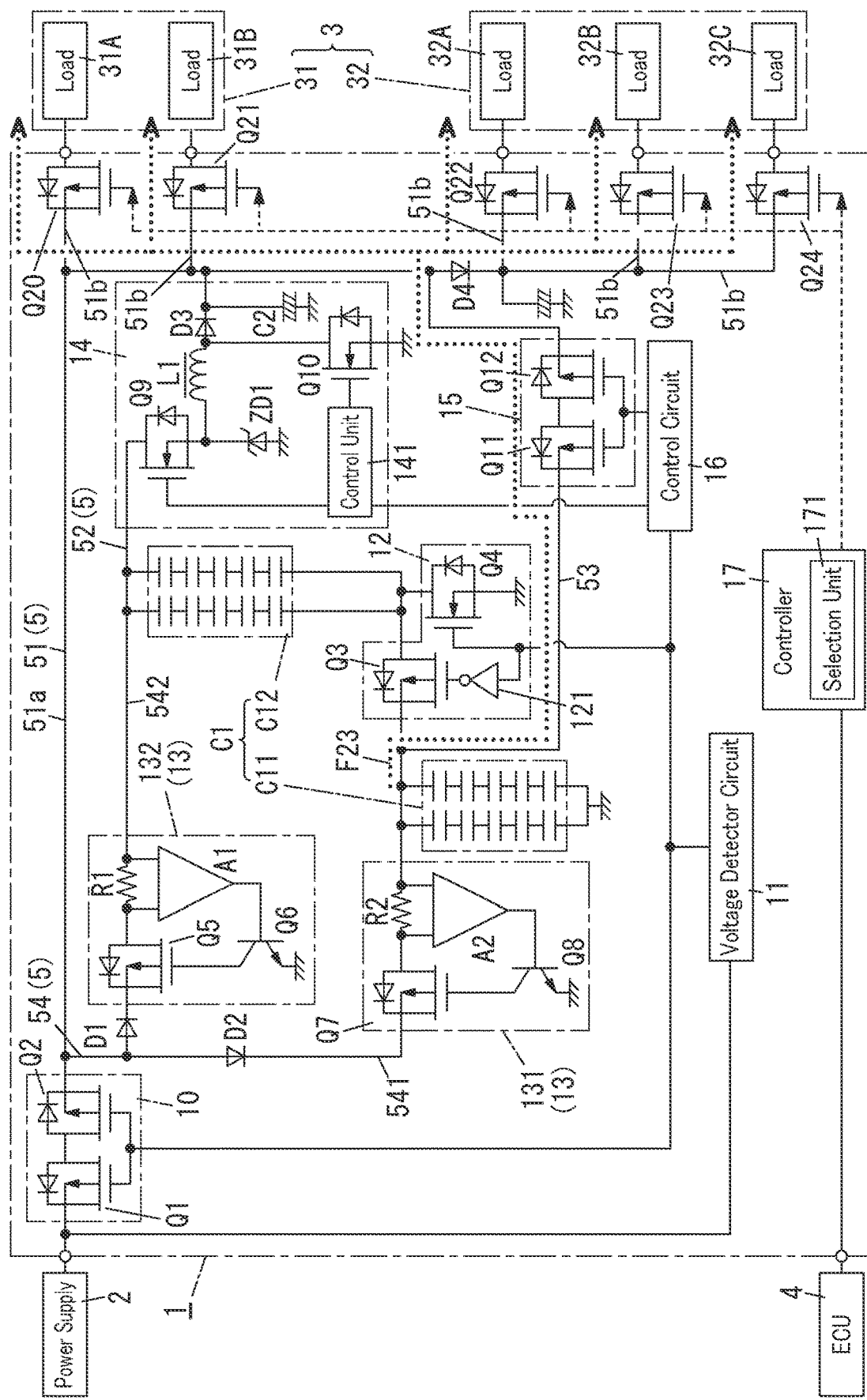
FIG. 4 is a schematic circuit diagram showing a current path in a situation where a power supply of the backup power supply system has caused a failure.
Figure 5:
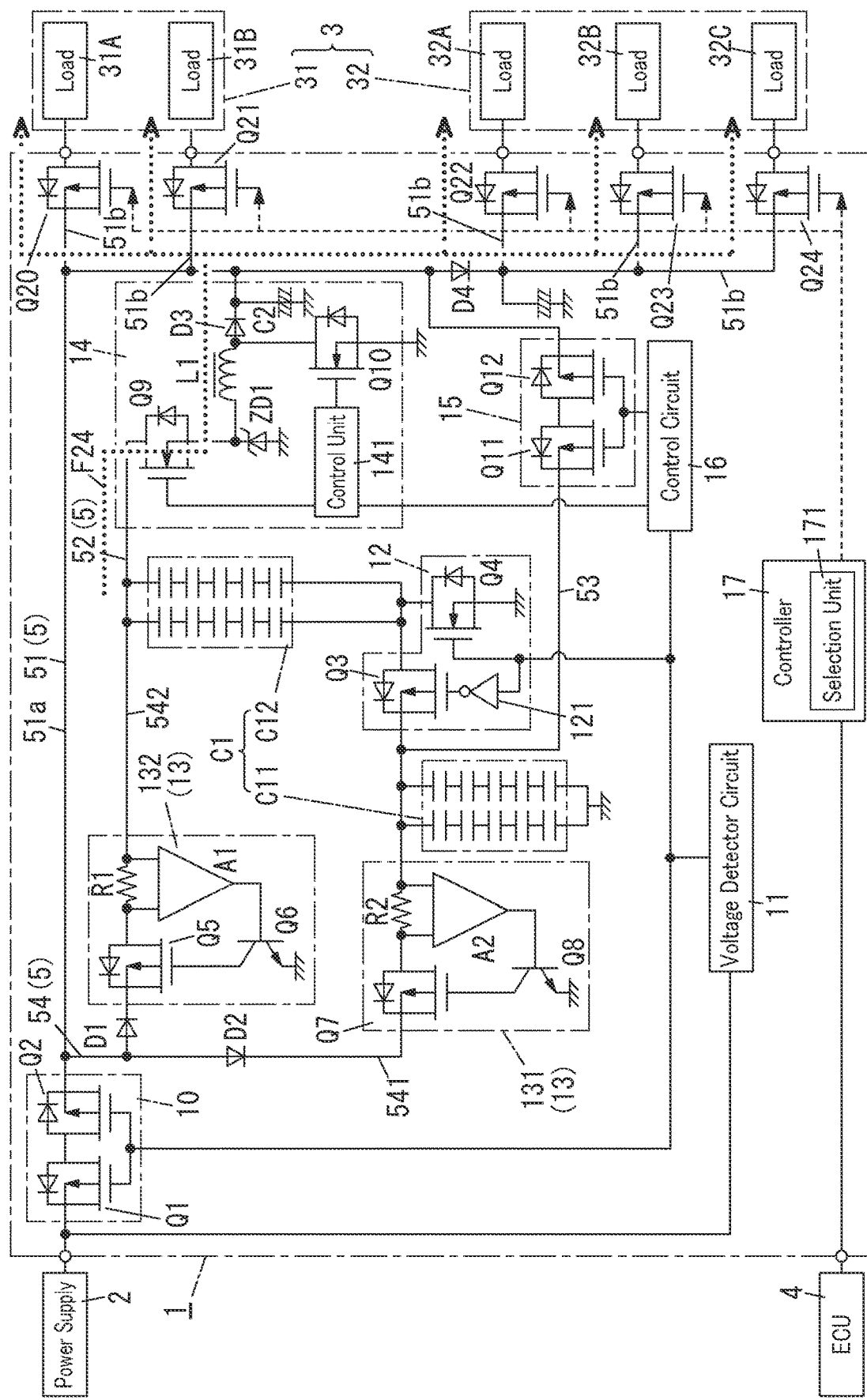
FIG. 5 is a schematic circuit diagram showing a current path in a situation where the power supply of the backup power supply system has caused a failure.

Also, while the power supply 2 is causing no failure, the switching element Q3 of the switching unit 12 turns OFF and the switching element Q4 thereof turns ON, thus making the first power storage device C11 and the second power storage device C12 electrically connected to the power supply 2 in parallel. As a result, the first dropper power supply circuit 131 and the second dropper power supply circuit 132 charge the first power storage device C11 and the second power storage device C12 while lowering the output voltage of the power supply 2. In FIG. 3, the arrows F21 and F22 indicate the current paths in such a situation. As can be seen, at the time of charging, the plurality of power storage devices C1 are connected to the power supply 2 in parallel and are charged by the dropper power supply circuits 13.

Thus, the voltage of the plurality of power storage devices C1 that have been fully charged becomes equal to or lower than the output voltage of the power supply 2. At this time, the first dropper power supply circuit 131 and the second dropper power supply circuit 132 that charge the first power storage device C11 and the second power storage device C12, respectively, do not perform any switching operation, thus reducing the heat and noise involved with the switching operation.

(1.2.2) When Power Supply has Caused Failure

When the power supply 2 has caused a failure and the voltage detector circuit 11 outputs the power failure signal, the main switch 10 turns OFF and the first power supply path 51 and the fourth power supply path 54 are cut off. In addition, when the voltage detector circuit 11 outputs the power failure signal, the switching element Q3 of the switching unit 12 turns ON and the switching element Q4 thereof turns OFF, thus making the first power storage device C11 and the second power storage device C12 connected to each other in series. Meanwhile, upon receiving the power failure signal from the voltage detector circuit 11, the control circuit 16 outputs an activate instruction to the control unit 141 of the voltage transformer circuit 14 to activate the voltage transformer circuit 14. In this case, it takes some time for the voltage transformer circuit 14 to output a voltage equal to or higher than the minimum guaranteed operating voltage since the voltage transformer circuit 14 has started its transformation operation (i.e., it takes some time to fully activate the voltage transformer circuit 14). Therefore, the control circuit 16 controls the switch 15 to keep the switch 15 ON until a predetermined time passes since the timing when the power failure signal was received. If the switch 15 turns ON, the third power supply path 53 becomes electrically conductive. This allows power to be supplied from the first power storage device C11 having the lower potential to the loads 3 through the third power supply path 53. At this time, a current flows from the first power storage device C11 to the plurality of loads 3 along the path indicated by the arrow F23 in FIG. 4. The first power storage device C11 has been charged to a voltage equal to or higher than the minimum guaranteed operating voltage. This allows the loads 3 to be operated with power supplied from the first power storage device C11 to the loads 3 until the voltage transformer circuit 14 is fully activated, thus reducing the chances of the supply of the output voltage to the loads 3 being cut off.

Thereafter, when a predetermined time passes since the timing when the power supply 2 caused the failure, the control circuit 16 turns the switch 15 OFF and the voltage transformer circuit 14 lowers the output voltages of the first power storage device C11 and the second power storage device C12 and supplies the output voltage thus generated to the loads 3. At this time, a current flows from the voltage transformer circuit 14 to the loads 3 along the path indicated by the arrow F24 in FIG. 4. In this case, if the power supply 2 has caused a failure, the first power storage device C11 and the second power storage device C12 are connected to each other in series, thus making the output voltages of the first power storage device C11 and the second power storage device C12 higher than the minimum guaranteed operating voltage of the loads 3. This allows the voltage transformer circuit 14 to supply an output voltage, generated by lowering the output voltages of the first power storage device C11 and the second power storage device C12, to the loads 3. This enables reducing the amount of current flowing through the primary circuit section of the voltage transformer circuit 14, thus reducing the heat and noise to be generated by the switching element Q10 when the voltage transformer circuit 14 performs the switching operation.

In this case, a diode, which causes a current to flow in the direction in which power is supplied to the one or more loads 3, is inserted into the third power supply path 53 (bypass path). In this embodiment, a parasitic diode of a MOSFET serving as the switching element Q12 functions as the diode causing a current to flow in the direction in which power is supplied to the loads 3. The parasitic diode of the MOSFET serving as the switching element Q12 substantially prevents a current from flowing in the opposite direction from the direction in which power is supplied from the first power storage device C11 to the loads 3. This may reduce the chances of the power that should be supplied to the loads 3 flowing through the first power storage device C11 to cause shortage of the power to be supplied to the loads 3. Optionally, in this embodiment, another diode which causes a current to flow in the direction in which power is supplied to the loads 3 may be connected to the third power supply path 53 separately from the parasitic diode of the MOSFET serving as the switching element Q12. This may substantially prevent a current from flowing in the opposite direction.

Note that on the first power supply path 51, a diode D4 is connected between the branch path 51b to which the first load 31 is connected and the branch path 51b to which the second load 32 is connected. Thus, the diode D4 may prevent, in a situation where power is supplied from the power storage devices C1 to the second load 32 through either the second power supply path 52 or the third power supply path 53, the power supplied to the second load 32 from flowing backward through the first power supply path 51 into the first load 31.

(1.2.3) Operation of Selecting Target Load

As described above, in the backup power supply system 1 according to this embodiment, the selection unit 171 of the controller 17 selects the target load 3 in accordance with the notification information provided by the ECU 4 of the vehicle 9.

Figure 6:
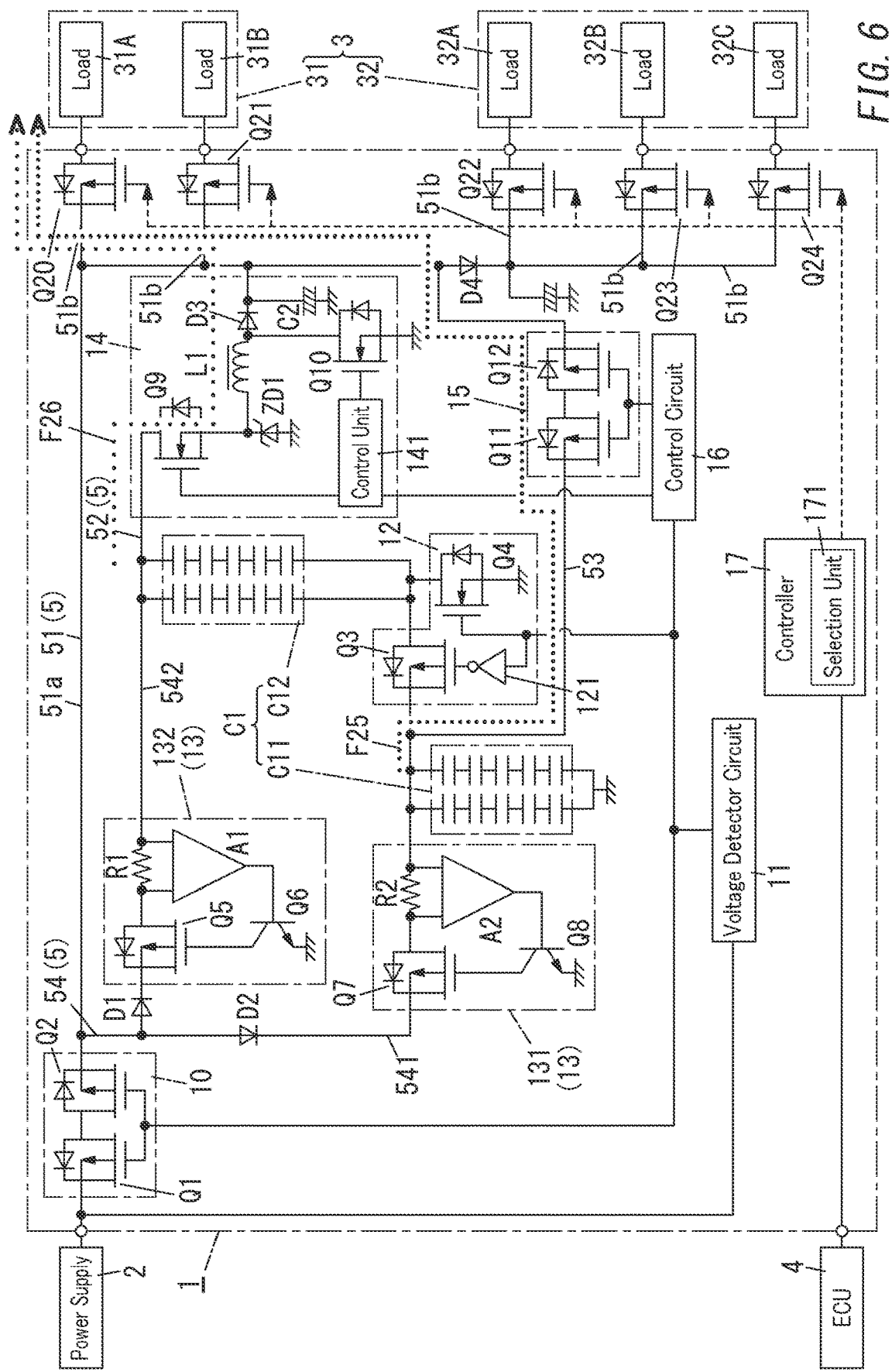
FIG. 6 is a schematic circuit diagram showing how the backup power supply system supplies power when the vehicle stops while traveling at a constant speed.

For example, if the power supply 2 has caused a failure in a vehicle 9 traveling at a predetermined speed (e.g., 60 km/h), then the selection unit 171 turns the switch Q20 ON and turns the switches Q21-Q24 OFF to supply power from the power storage device C1 to only the braking device 31A (refer to FIG. 6). Even so, until the voltage transformer circuit 14 is fully activated since the timing when the power supply 2 caused the failure, power is also supplied from the first power storage device C11 to the braking device 31A through the third power supply path 53 (bypass path) (i.e., along the path indicated by the arrow F25 in FIG. 6). Then, when the voltage transformer circuit 14 is fully activated, power is supplied from the voltage transformer circuit 14 to the braking device 31A through the second power supply path 52 (i.e., along the path indicated by the arrow F26 in FIG. 6).

In this embodiment, a constant voltage equal to or higher than the minimum guaranteed operating voltage is supplied continuously to the loads 3 for a certain time (of 6 seconds, for example) since the power supply 2 caused the failure. The certain time may be, for example, longer than the time it takes for the vehicle 9 traveling at the predetermined speed (of 60 km/h, for example) to stop safely on the same lane. This allows, even if the power supply 2 has caused a failure while the vehicle 9 is traveling at the predetermined speed, the driver to stop the vehicle 9 safely.

Figure 7:
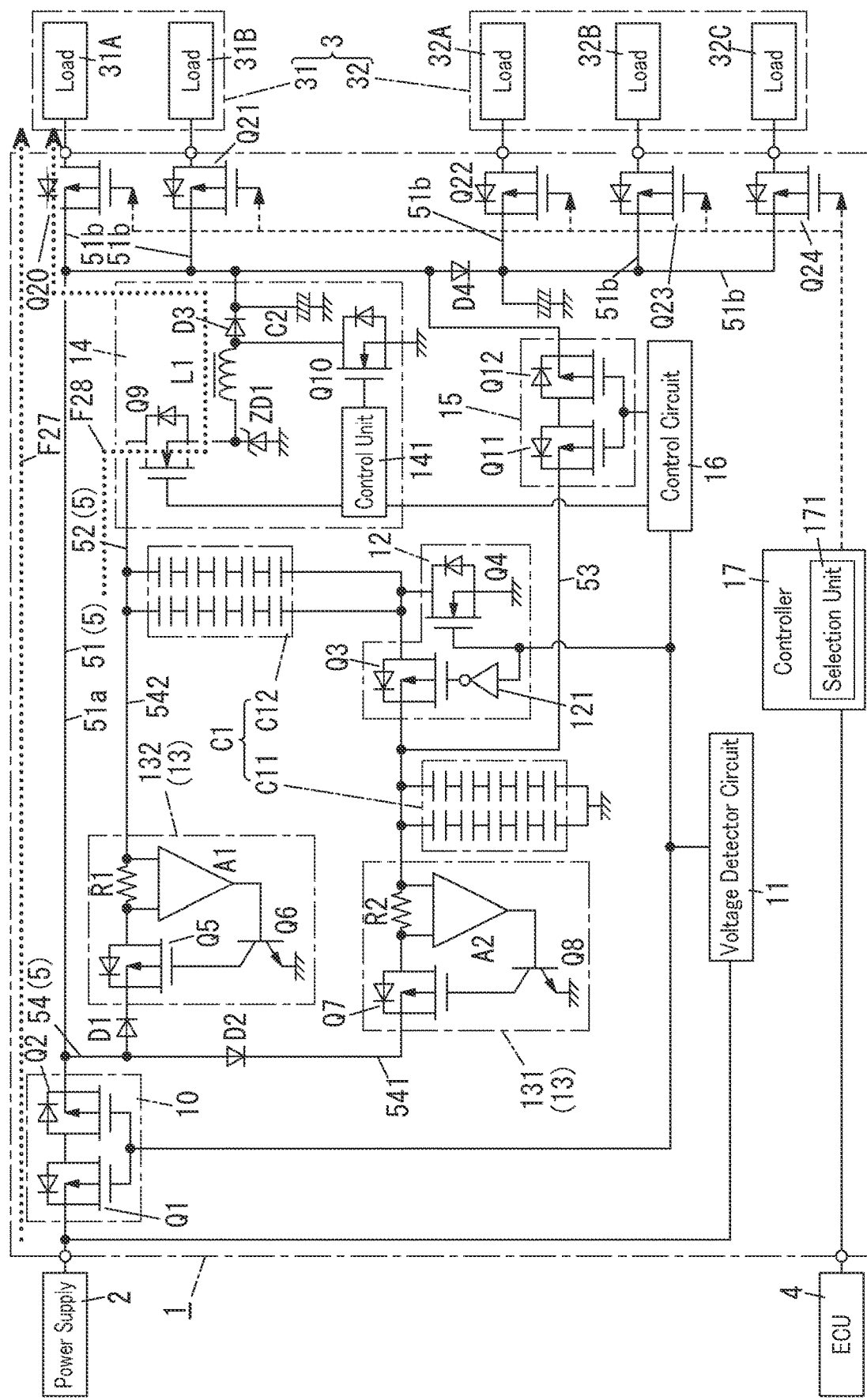
FIG. 7 is a schematic circuit diagram showing how the backup power supply system supplies power while the vehicle is making remote parking.

In addition, the backup power supply system 1 also allows, when parking the vehicle 9 by remote control (i.e., when making so-called "remote parking") while the power supply 2 of the vehicle 9 is operating properly, for example, power to be supplied from the voltage transformer circuit 14 to the braking device 31A through the second power supply path 52. Stated otherwise, only when the power supply 2 is operating properly and power may be supplied from the backup power supply system 1 to the braking device 31A, the vehicle 9 may make remote parking. That is to say, the vehicle 9 may make remote parking only when a path for supplying power from the power supply 2 to the braking device 31A (i.e., the path indicated by the arrow F27) and the path for supplying power from the voltage transformer circuit 14 to the braking device 31A (i.e., the path indicated by the arrow F28) are both secured as shown in FIG. 7. In that case, the selection unit 171 of the controller 17 allows, in accordance with the notification information provided by the ECU 4 that remote parking is going to be made, the power to be supplied from the power storage device C1 to only the braking device 31A by turning the switch Q20 ON and turning the switches Q21-Q24 OFF. Then, the controller 17 controls the switching unit 12 to switch the electrical connection to the second state where the first power storage device C11 and the second power storage device C12 are connected to each other in series, outputs a control signal to the control circuit 16 to control the switch 15 to OFF state, and activates the voltage transformer circuit 14. This makes power suppliable from the voltage transformer circuit 14 to the braking device 31A, thus allowing the vehicle 9 to make remote parking.

If the power supply 2 causes a failure while the vehicle 9 is making remote parking, then power starts to be supplied from the voltage transformer circuit 14 to the braking device 31A (along the path indicated by the arrow F28 in FIG. 7), thus allowing the driver to stop the vehicle 9 safely.

Note that if the voltage transformer circuit 14 does not start to be activated until the power supply 2 has caused a failure while the vehicle 9 is making remote parking, then the controller 17 may control the switch 15 to ON state to supply power from the first power storage device C11 to the braking device 31A until the voltage transformer circuit 14 is fully activated. In that case, when the voltage transformer circuit 14 is fully activated, the controller 17 may control the switch 15 to OFF state to supply power from the voltage transformer circuit 14 to the braking device 31A.

Note that the backup power supply system 1 still allows the vehicle 9 to make remote parking even if the vehicle 9 has not been used for a predetermined period (of 75 days, for example). The power storage devices C1 discharge when left unused for a long time. However, the charging and discharging performance thereof is set to make the braking device 31A operable even after the predetermined period has passed.

(2) Variations

Next, variations of the exemplary embodiment will be enumerated one after another. Note that the variations to be described below may be adopted in combination as appropriate. The following description of variations will be focused on differences from the exemplary embodiment described above. Any constituent element of the variations, having the same function as a counterpart of the exemplary embodiment described above, will be designated by the same reference numeral as that counterpart's, and description thereof will be omitted herein.

In the exemplary embodiment described above, the power storage devices C1 may each be a secondary battery such as a lithium-ion capacitor (LIC) or a lithium-ion battery (LIB). In the lithium-ion capacitor, the cathode thereof may be made of the same material (such as activated carbon) as an EDLC and the anode thereof may be made of the same material (e.g., a carbon material such as graphite) as an LIB.

Also, the power storage device C1 does not have to be an EDLC but may also be an electrochemical device having a configuration to be described below. As used herein, the "electrochemical device" includes a cathode member, an anode member, and a nonaqueous electrolyte solution. The cathode member includes a cathode current collector and a cathode material layer supported by the cathode current collector and containing a cathode active material. The cathode material layer contains a conductive polymer serving as a cathode active material for doping and de-doping an anion (dopant). The anode member includes an anode material layer containing an anode active material. The anode active material may be, for example, a material that advances an oxidation-reduction reaction involving occlusion and release of a lithium ion. Specifically, examples of the anode active material include carbon materials, metal compounds, alloys, and ceramics. The nonaqueous electrolyte solution may have, for example, lithium-ion conductivity. A nonaqueous electrolyte solution of this type includes a lithium salt and a nonaqueous solution that dissolves the lithium salt. An electrochemical device having such a configuration has a higher energy density than an electrical double layer capacitor, for example.

Furthermore, in the embodiment described above, the voltage transformer circuit 14 includes a step-up DC/DC converter. However, the circuit configuration of the voltage transformer circuit 14 may be modified as appropriate as long as the voltage transformer circuit 14 may transform the input voltage into a voltage value adapted to the loads 3. For example, the voltage transformer circuit 14 may include a step-up/step-down DC/DC converter.

Furthermore, in the exemplary embodiment described above, the power storage devices C1 are charged with the output of the dropper power supply circuits 13. However, the circuit for supplying a charge current to the power storage devices C1 does not have to be the dropper power supply circuits 13. The circuit for supplying the charge current to the power storage devices C1 is preferably a circuit other than a switching power supply circuit and may be a series regulator circuit or a circuit including a current limiting resistor connected between the power supply 2 and the power storage devices C1.

Furthermore, in the exemplary embodiment described above, each of the first load 31 and the second load 32 is a group of loads (i.e., includes a plurality of loads). However, this is only an example and should not be construed as limiting. Alternatively, each of the first load 31 and the second load 32 may be a single load. Still alternatively, at least one of the first load 31 or the second load 32 may be a group of loads.

Furthermore, in the exemplary embodiment described above, the first load 31 satisfies both the first condition and the second condition in contrast to the second load 32. However, this is only an example and should not be construed as limiting. Alternatively, the first load 31 may satisfy at least one of the first condition or the second condition. Note that the first condition is that the load have a relatively large power consumption (i.e., require a relatively large operating current). The second condition is that the load require a relatively low minimum guaranteed operating voltage.

Furthermore, in the exemplary embodiment described above, the target device including the plurality of loads 3 is a vehicle 9 (moving vehicle). However, the target device does not have to be a vehicle 9 (moving vehicle) but may also be a piece of electrical equipment for use in a facility, for example.

(Recapitulation)

As can be seen from the foregoing description, a backup power supply system (1) according to a first aspect supplies power to one or more loads (3) in a situation where a power supply (2) has caused a failure. The backup power supply system (1) includes a plurality of power storage devices (C1) and a switching unit (12). The plurality of power storage devices (C1) are charged by the power supply (2). The switching unit (12) switches electrical connection between the plurality of power storage devices (C1) to either a first state where the plurality of power storage devices (C1) are connected to the power supply (2) in parallel or a second state where the plurality of power storage devices (C1) are connected to each other in series. The switching unit (12) switches the electrical connection to the first state while the plurality of power storage devices (C1) are being charged and switches the electrical connection to the second state when the power supply (2) has caused the failure.

According to this aspect, when charged, the plurality of power storage devices (C1) are connected to the power supply (2) in parallel. This allows the plurality of power storage devices (C1) to be charged with a lower voltage than in a situation where the plurality of power storage devices (C1) are connected to each other in series. Thus, there is no need for a charger circuit for charging the plurality of power storage devices (C1) to boost the voltage of the power supply (2) to a higher voltage, thus reducing the chances of the switching operation by the charger circuit generating noise and/or heat. In addition, when the power supply (2) has caused a failure, the plurality of power storage devices (C1) are connected to each other in series. This allows the plurality of power storage devices (C1) to output a higher voltage than in a situation where the plurality of power storage devices (C1) are connected to each other in parallel. Thus, there is no need for a voltage transformer circuit for transforming the output voltage of the plurality of power storage devices (C1) into a voltage required for the loads (3) to boost the output voltage of the plurality of power storage devices (C1) to a higher voltage, thus reducing the chances of the switching operation by the voltage transformer circuit generating noise and/or heat. Consequently, the present disclosure enables providing a backup power supply system (1) with ability to reduce the noise to be generated and providing a backup power supply system (1) with ability to reduce the heat to be generated.

In a backup power supply system (1) according to a second aspect, which may be implemented in conjunction with the first aspect, the plurality of power storage devices (C1) includes: a first power storage device (C11) to have a lower potential in the second state; and a second power storage device (C12) to have a higher potential in the second state. The backup power supply system (1) further includes a bypass path (53), through which power is supplied from the first power storage device (C11) to the one or more loads (3) in a situation where the power supply (2) has caused the failure.

This aspect enables supplying power from the first power storage device (C11) to the one or more loads (3) through the bypass path (53).

In a backup power supply system (1) according to a third aspect, which may be implemented in conjunction with the second aspect, a diode is inserted into the bypass path (53). The diode allows a current to flow in a direction in which power is supplied to the one or more loads (3).

This aspect enables reducing the chances of a current flowing through the bypass path (53) in an opposite direction from the direction in which the power is supplied.

A backup power supply system (1) according to a fourth aspect, which may be implemented in conjunction with the second or third aspect, further includes a voltage transformer circuit (14) and a switch (15). The voltage transformer circuit (14) transforms, in a situation where the power supply (2) has caused the failure, an output voltage of the plurality of power storage devices (C1) that are connected to each other in series into an output voltage adapted to the one or more loads (3). The switch (15) is inserted into the bypass path (53). In a situation where the power supply (2) has caused the failure, the switch (15) remains ON until the voltage transformer circuit (14) is activated and turns OFF when the voltage transformer circuit (14) is fully activated.

According to this aspect, power is supplied continuously through the bypass path (53) to the one or more loads (3) until the voltage transformer circuit (14) is activated. This may reduce the chances of the supply of power to the one or more loads (3) being cut off.

A backup power supply system (1) according to a fifth aspect, which may be implemented in conjunction with the fourth aspect, further includes a control circuit (16). The control circuit (16) starts activating the voltage transformer circuit (14) when the power supply (2) has caused the failure and controls the switch (15) to keep the switch (15) ON until the voltage transformer circuit (14) is activated and to turn the switch (15) OFF when the voltage transformer circuit (14) is fully activated.

According to this aspect, power is supplied continuously through the bypass path (53) to the one or more loads (3) until the voltage transformer circuit (14) is activated. This may reduce the chances of the supply of power to the one or more loads (3) being cut off.

A backup power supply system (1) according to a sixth aspect, which may be implemented in conjunction with any one of the first to fifth aspects, further includes dropper power supply circuits (13). The dropper power supply circuits (13) charge the plurality of power storage devices (C1) with the power supplied from the power supply (2).

According to this aspect, the dropper power supply circuits (13) charge the plurality of power storage devices (C1). This may reduce, compared to a situation where the plurality of power storage devices (C1) are charged with a voltage boosted by a switching power supply, the chances of the switching power supply generating noise and/or heat.

In a backup power supply system (1) according to a seventh aspect, which may be implemented in conjunction with any one of the first to sixth aspects, the one or more loads (3) include a plurality of loads (3). The backup power supply system (1) further includes a selection unit (171). The selection unit (171) selects, according to a status of use of a target device (9) provided with the plurality of loads (3), any one of the plurality of loads (3) as a target load to which power is to be supplied.

According to this aspect, power is supplied to only the load (3) selected according to the status of use of the target device (9). This enables supplying power for a longer time than in a situation where power is supplied to all of the plurality of loads (3).

In a backup power supply system (1) according to an eighth aspect, which may be implemented in conjunction with the seventh aspect, the plurality of loads (3) includes: a first load (31) including an actuator; and a second load (32) serving as a control system to control the actuator.

This aspect enables selecting, according to the status of use of the target device (9), the target load (3) from the first load (31) and the second load (32).

A backup power supply system (1) according to a ninth aspect, which may be implemented in conjunction with any one of the first to eighth aspects, further includes a power supply path (51) through which power is supplied from the power supply (2) to the one or more loads (3).

This aspect enables supplying power from the power supply (2) to the one or more loads (3) through the power supply path (51).

A moving vehicle (9) according to a tenth aspect includes the backup power supply system (1) according to any one of the first to ninth aspects and a moving vehicle body (91). The moving vehicle body (91) is equipped with the backup power supply system (1) and the one or more loads (3).

This aspect enables providing a moving vehicle (9) with the ability to reduce the noise to be generated.

Note that these are not the only aspects of the present disclosure but various configurations (including variations) of the backup power supply system (1) according to the exemplary embodiment described above may also be implemented as a method for controlling the backup power supply system (1), a (computer) program, or a non-transitory storage medium that stores the program thereon.

Note that the constituent elements according to the second to eighth aspects are not essential constituent elements for the backup power supply system (1) but may be omitted as appropriate.

REFERENCE SIGNS LIST

1 Backup Power Supply System
2 Power Supply
3 Load
9 Vehicle (Moving Vehicle, Target Device)
12 Switching Unit
13 Dropper Power Supply Circuit
14 Voltage Transformer Circuit
15 Switch
16 Control Circuit
31 First Load
32 Second Load
51 First Power Supply Path (Power Supply Path)
53 Third Power Supply Path (Bypass Path)
91 Moving Vehicle Body
171 Selection Unit
C1 Power Storage Device
C11 First Power Storage Device
C12 Second Power Storage Device

The invention claimed is:

1. A backup power supply system configured to supply power to one or more loads in a situation where a power supply has caused a failure, the backup power supply system comprising:
a plurality of power storage devices configured to be charged by the power supply;
a switching unit configured to switch electrical connection between the plurality of power storage devices to either a first state where the plurality of power storage devices are connected to the power supply in parallel or a second state where the plurality of power storage devices are connected to each other in series;
a first switch; and
a second switch, wherein:
the switching unit is configured to switch the electrical connection to the first state while the plurality of power storage devices are being charged and to switch the electrical connection to the second state when the power supply has caused the failure,
the plurality of power storage devices includes:
a first power storage device having a first terminal and a second terminal; and
a second power storage device having a third terminal and a fourth terminal,
the first terminal of the first power storage device is connected to a reference potential of the power supply,
the first switch is connected between;
the power supply, and
the second terminal of the first power storage device and the fourth terminal of the second power storage device,
the first switch is configured to be turned on in the first state and turned off in the second state,
the second switch is connected between the fourth terminal of the second power storage device and the one or more loads,
the second switch is configured to be turned off in the first state and turnd on in the second state,
the switching unit is configured to:
connect the third terminal of the second power storage device to the reference potential of the power supply in the first state, and
connect the third terminal of the second power storage device to the second terminal of the first power storage device in the second state,
the backup power supply system further includes a bypass path, and
the bypass path is configured to connect the second terminal of the first power storage device with the one or more loads to allow power to be supplied from the first power storage device to the one or more loads therethrough in a situation where the power supply has caused the failure.

2. The backup power supply system of claim 1, wherein a diode is inserted into the bypass path, the diode being configured to allow a current to flow in a direction in which power is supplied to the one or more loads.

3. The backup power supply system of claim 2, further comprising:
a voltage transformer circuit configured to, in a situation where the power supply has caused the failure, transform an output voltage of the plurality of power storage devices that are connected to each other in series into an output voltage adapted to the one or more loads; and
a third switch inserted into the bypass path, wherein
the third switch is configured to, in a situation where the power supply has caused the failure, remain ON until the voltage transformer circuit is activated and turn OFF when the voltage transformer circuit is fully activated.

4. The backup power supply system of claim 3, further comprising a control circuit configured to start activating the voltage transformer circuit when the power supply has caused the failure and control the third switch to keep the switch ON until the voltage transformer circuit is activated and to turn the switch OFF when the voltage transformer circuit is fully activated.

5. The backup power supply system of claim 2, further comprising dropper power supply circuits configured to charge the plurality of power storage devices with the power supplied from the power supply.

6. The backup power supply system of claim 2, wherein the one or more loads include a plurality of loads, and the backup power supply system further includes a selection unit configured to select, according to a status of use of a target device provided with the plurality of loads, any one of the plurality of loads as a target load to which power is to be supplied.

7. The backup power supply system of claim 1, further comprising:
a voltage transformer circuit configured to, in a situation where the power supply has caused the failure, transform an output voltage of the plurality of power storage devices that are connected to each other in series into an output voltage adapted to the one or more loads; and
a third switch inserted into the bypass path, wherein
the third switch is configured to, in a situation where the power supply has caused the failure, remain ON until the voltage transformer circuit is activated and turn OFF when the voltage transformer circuit is fully activated.

8. The backup power supply system of claim 7, further comprising a control circuit configured to start activating the voltage transformer circuit when the power supply has caused the failure and control the third switch to keep the switch ON until the voltage transformer circuit is activated and to turn the switch OFF when the voltage transformer circuit is fully activated.

9. The backup power supply system of claim 8, further comprising dropper power supply circuits configured to charge the plurality of power storage devices with the power supplied from the power supply.

10. The backup power supply system of claim 8, wherein the one or more loads include a plurality of loads, and the backup power supply system further includes a selection unit configured to select, according to a status of use of a target device provided with the plurality of loads, any one of the plurality of loads as a target load to which power is to be supplied.

11. The backup power supply system of claim 7, further comprising dropper power supply circuits configured to charge the plurality of power storage devices with the power supplied from the power supply.

12. The backup power supply system of claim 7, wherein the one or more loads include a plurality of loads, and the backup power supply system further includes a selection unit configured to select, according to a status of use of a target device provided with the plurality of loads, any one of the plurality of loads as a target load to which power is to be supplied.

13. The backup power supply system of claim 1, further comprising dropper power supply circuits configured to charge the plurality of power storage devices with the power supplied from the power supply.

14. The backup power supply system of claim 1, wherein the one or more loads include a plurality of loads, and the backup power supply system further includes a selection unit configured to select, according to a status of use of a target device provided with the plurality of loads, any one of the plurality of loads as a target load to which power is to be supplied.

15. The backup power supply system of claim 14, wherein the plurality of loads includes:
a first load including an actuator; and
a second load serving as a control system configured to control the actuator.

16. The backup power supply system of claim 1, further comprising a power supply path through which power is supplied from the power supply to the one or more loads.

17. A moving vehicle comprising:
the backup power supply system of claim 1; and
a moving vehicle body equipped with the backup power supply system and the one or more loads.

\* \* \* \* \*